US011486407B2

(12) United States Patent
Fessel et al.

(10) Patent No.: US 11,486,407 B2
(45) Date of Patent: Nov. 1, 2022

(54) METHOD FOR CONTROLLING AT LEAST TWO FANS

(71) Applicant: ebm-papst Mulfingen GmbH & Co. KG, Mulfingen (DE)

(72) Inventors: Andreas Fessel, Weikersheim (DE); Stefan Schwab, Heilbronn (DE); Walter Eberle, Mulfingen (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 276 days.

(21) Appl. No.: 16/623,865

(22) PCT Filed: Jul. 12, 2018

(86) PCT No.: PCT/EP2018/068886
§ 371 (c)(1),
(2) Date: Dec. 18, 2019

(87) PCT Pub. No.: WO2019/016056
PCT Pub. Date: Jan. 24, 2019

(65) Prior Publication Data
US 2020/0340485 A1 Oct. 29, 2020

(30) Foreign Application Priority Data
Jul. 20, 2017 (DE) ...................... 10 2017 116 399.9

(51) Int. Cl.
*F04D 27/00* (2006.01)
*F04D 25/16* (2006.01)
(Continued)

(52) U.S. Cl.
CPC ......... *F04D 27/004* (2013.01); *F04D 25/166* (2013.01); *F04D 25/08* (2013.01);
(Continued)

(58) Field of Classification Search
None
See application file for complete search history.

(56) References Cited

U.S. PATENT DOCUMENTS

| 6,227,961 B1 | 5/2001 | Moore et al. |
| 8,849,463 B2 * | 9/2014 | Hopkins ................. F24F 11/30 |
| | | 700/276 |

(Continued)

FOREIGN PATENT DOCUMENTS

| DE | 202016103978 U1 | 8/2016 |
| DE | 102016113496 A1 | 1/2018 |

(Continued)

OTHER PUBLICATIONS

European Patent Office, Rijswijk, Netherlands, International Search Report of International Application No. PCT/EP2018/068886, dated Dec. 10, 2018, 2 pages.

*Primary Examiner* — Charles G Freay
(74) *Attorney, Agent, or Firm* — Dickinson Wright PLLC (57) ABSTRACT

A control device and a method for controlling a system having at least two fans (1) and/or fan groups for generating a defined setpoint value (VG,setpoint, ΔpG,setpoint), wherein, by changing the operating points of at least one fan (1) depending on which setpoint value is fixedly predetermined, at least one of the fans (1) is brought to an optimal operating point and thereby the efficiency ηG of the system is increased.

17 Claims, 9 Drawing Sheets

(51) Int. Cl.
*F04D 25/08* (2006.01)
*F24F 11/46* (2018.01)
*F24F 11/00* (2018.01)
*F24F 11/74* (2018.01)

(52) U.S. Cl.
CPC .......... *F24F 11/0001* (2013.01); *F24F 11/46* (2018.01); *F24F 11/74* (2018.01)

(56) References Cited

U.S. PATENT DOCUMENTS

| | | | |
|---|---|---|---|
| 11,181,118 B2* | 11/2021 | Fessel | F04D 25/166 |
| 2004/0185771 A1* | 9/2004 | Hopkins | F04D 27/0261 |
| | | | 454/256 |
| 2010/0057258 A1 | 3/2010 | Clanin | |
| 2011/0074317 A1* | 3/2011 | Gibson | F04D 25/166 |
| | | | 318/68 |
| 2012/0244015 A1 | 9/2012 | Benson et al. | |
| 2017/0082111 A1 | 3/2017 | Barron et al. | |

FOREIGN PATENT DOCUMENTS

| | | |
|---|---|---|
| GB | 2134646 A | 8/1984 |
| WO | 2004085928 A2 | 10/2004 |

\* cited by examiner

METHOD FOR CONTROLLING AT LEAST TWO FANS

CROSS REFERENCE TO RELATED APPLICATIONS

This application is a 35 U.S.C. § 371 national phase application of International Application No.: PCT/EP2018/068886, filed Jul. 12, 2018, which claims the benefit of priority under 35 U.S.C. § 119 to German Patent Application No.: 10 2017 116 399.9, filed Jul. 20, 2017, the contents of which are incorporated herein by reference in their entirety.

FIELD

The invention relates to a control method for the power optimized or efficiency optimized operation of at least two or of a plurality of fans, for generating a determined operating state in a ventilation system.

BACKGROUND

The statements in this section merely provide background information related to the present disclosure and several definitions for terms used in the present disclosure and may not constitute prior art.

The use of multiple fans or fan groups with a plurality of individual fans for generating a defined volume flow with variable pressure increase or a defined pressure in the case of variable volume flow can occur under different operating conditions of the participating fans, which each entail a total power demand and accordingly also a different total efficiency.

When using multiple fans or fan groups or combinations thereof, the problem of using them, depending on the ventilation task, so that the respective system overall is operated with optimized or optimal total power demand or total efficiency, arises in practice.

Thus, there is a need for a control method for a number of at least two fans which, as a system, are controlled relative to one another so that, at a predetermined setpoint value (volume flow dV/dt—hereafter also abbreviated V—or pressure increase $\Delta p_{sys}$) for at least one of the fans from the number of the fans, the total power demand and the total efficiency of the system are optimized.

SUMMARY

Therefore, the underlying aim of the invention is to provide a method for controlling and a control device for a plurality of fans and/or fan groups, with the aid of which a power optimization and efficiency improvement of the overall system can be achieved, without additional construction measures on individual ones of the fans having to be carried out.

This aim is achieved by the feature combination according to a method for controlling a system consisting of a number n of at least two fans and/or fan groups for generating a defined setpoint value ($V_{G,setpoint}$, $\Delta p_{G,setpoint}$) of either a defined volume flow $V_{G,setpoint}$ in the system in the case of variable pressure increase $\Delta p_{G,setpoint}$ or vice versa. This method including the following steps:

a) determining the operating state of the fans;
b) determining the power optimization potential of the respective fan(s);
c) comparing the operating state determined in the aforementioned step a) with the respective optimized operating state of the fan(s) from step b), in order to obtain an optimization recommendation with respect to one fan, and
d) correction of the respective variable setpoint value ($V_{G,setpoint}$, $\Delta p_{G,setpoint}$) by changing the operating point of at least one fan, depending on which setpoint value is fixedly predetermined in order to bring at least one of the fans to a power optimized or optimal operating point and thereby to increase the efficiency $\eta_G$ of the system, wherein in step a), the determination of the operating state of the fans occurs in that at least the volume flow V and the rotation speed n of the respective fan are determined, and their pressure increase $\Delta p_{st}$, the power consumption P and the efficiency $\eta_G$ are determined as a function of the volume flow and of the rotation speed, which are preferably stored in the motor electronics of the plurality of fans, and wherein, in the determination of the optimization recommendation for the adjustment of the operating state in step c), it is taken into consideration which fan has the highest power contribution in the air conveyance in the system.

This aim is achieved by the feature combination according to a control device for carrying out the method described above and as further defined herein, wherein the control device comprises the following:

a. acquisition means for determining the volume flow of individual fans and all the fans;
b. determining of a power optimization potential $V_{opt}$ and $\Delta p_{st, opt}$ of the respective fans, which can be achieved with constant rotation speed with the rotation speed n;
c. a comparator for comparing determined operating states and optimized operating states in order to obtain a specific optimization recommendation therefrom; and
d. means for the adjustment of the respective variable setpoint value by changing the operating state of at least one fan depending on which setpoint value in the system is fixedly predetermined, in order to bring at least one of the fans to a power optimized or optimal operating point and thereby increase the efficiency $\eta_G$ of the system.

The underlying idea of the invention consists in that the design of a control device and the control method for the plurality of fans are based on the fact that all the fans of a system know their operating state as well as their respective power optimization potential. On this basis, a control device can set the distribution of the air quantities to the individual fans or the pressure availability in the system so that an operation of the individual fans as well as of the overall system is achieved with optimal efficiency.

According to the invention, a method is therefore proposed for controlling a system consisting of a number n of at least two fans and/or fan groups for generating a defined setpoint value of either a defined volume flow in the system in the case of variable pressure increase or conversely in the case of a variable volume flow and a fixed pressure increase, with the following steps, wherein the mentioned pressure or the pressure increase in each case is the static pressure increase $\Delta p_{st}$:

a) determining the operating state of the fans;
b) determining the power optimization potential of the respective fan(s) (preferably also storing of the optimization data);
c) comparing the determined operating state in the aforementioned step a) with the respective optimized operating state of the fan(s) from step b), in order to obtain therefrom an optimization recommendation with respect to (at least) one fan, and
d) correction of the respective variable target value (volume flow or pressure increase) by changing the operating point or the current operating state of at least one fan, depending on which predetermined setpoint value is fixed and which setpoint value is variable, in order to bring at least one of the fans to a power optimized or optimal operating state and thereby to increase the efficiency $\eta_G$ of the system. The respective fixedly predetermined setpoint value here remains unchanged due to a separate control.

"Power optimized state" in the sense of the present invention is understood to mean a state in which a fan, after adjustment of its operating state, has a better efficiency than at the time before the adjustment and thus at the same time a "power optimized state" for the entire system, in which, after an optimization adjustment, the sum of the power consumptions of all the fans is less than at the time before the adjustment.

Thus, the determining of the power optimization potential in the aforementioned step b) involves in which concrete operating states a certain fan can be brought in each case to a power optimized state. This operating data can be used in the control method in order to transfer the fan in question to a certain operating state.

Advantageously step d) occurs in such a manner that a plurality, one or more fan groups or all the fans is/are brought to a power optimized or optimal operating point, in each case with respect to the uncorrected operating point.

Moreover, it can be advantageous if, in the method for increasing the efficiency $\eta_G$ of the system, at a defined fixed setpoint value (either volume flow or pressure increase) one or more of the fans are completely switched off for this purpose.

According to the invention it is provided that in the aforementioned step a), the determination of the operating state of the fans occurs in that at least the volume flow V and the rotation speed n of the respective fans are determined, and their pressure increase $\Delta p_{st}$, the power consumption P and the efficiency $\eta_G$ are acquired or determined as a function of the volume flow and the rotation speed, which are preferably stored in the motor electronics of the plurality of fans.

The pressure increase $\Delta pst$ and the power consumption P of the respective fan are here determined preferably from its volume flow V and its rotation speed n. Overall, it is provided to acquire the variable pressure increase $\Delta pst$, power consumption P and efficiency $\eta G$ as functions $f=f(V, n)$ and to have them available for the control method.

The method according to the invention is moreover preferably designed so that, for determining the optimization potential in the aforementioned step b), an optimized volume flow $V_{opt}$ and an optimized pressure increase $\Delta p_{opt}$ are determined.

Furthermore, it is provided advantageously that, from the comparison of the operating states from step a) and step b), an optimization recommendation in the form of an adjustment of the current operating state of one or more of the fans occurs, wherein the optimization recommendation in the case of a defined volume flow $V_{G,setpoint}$ to be kept constant consists in carrying out a pressure increase or a pressure lowering, depending on whether the optimized pressure increase $\Delta p_{opt}$ is greater than or smaller than the determined pressure increase $\Delta p_{st}$ or the optimization recommendation in the case of a defined pressure $\Delta p_{G,setpoint}$ to be kept constant consists in increasing or lowering the volume flow, depending on whether the optimized volume flow $V_{opt}$ is greater than or smaller than the determined volume flow V.

In the determination of the optimization recommendation, for the adjustment of the operating state in step c), it is taken into consideration which fan or fan group has the respective highest power contribution in the air conveyance in the system, wherein the acquisition of the power consumption P of each fan in each case occurs before and after a correction in step d), and it is determined whether the total sum of all the power consumptions P of the fans, in reaction to the optimization step, was reduced in comparison to the previously determined total sum of all the power consumptions P.

In case the total sum of all the power consumptions P after the optimization was not reduced, the adjustment in the previously performed optimization step is reversed.

This measure of adjustment is cyclically repeated until the result is a defined total efficiency or a total efficiency optimized in each case with respect to the respective cycle, or until said total efficiency is asymptomatically approached, wherein the measures are interrupted after a defined number of cycles or at a defined operating point.

An additional aspect of the present invention relates to a control device for carrying out a method as described above wherein the control device comprises the following:

acquisition means for determining at least the volume flow and the rotation speed n of individual fans and of all the fans;

determining of a power optimization potential of the respective fans, such as $V_{opt}=f(n)$, $\Delta p_{st,opt}=f(n)$, which can be reached with constant rotation speed (with the rotation speed n);

a comparator for comparing determined operating states and optimized operating states, in order to obtain a specific optimization recommendation therefrom;

means for the adjustment of the respective variable setpoint value (volume flow and pressure increase) by changing the operating state of at least one fan depending on which setpoint value is fixedly predetermined in the system, in order to bring one of the fans to a power optimized or optimal operating state and thereby increase the efficiency $\eta_G$ of the system.

There are various practical possibilities for designing and developing the teaching of the present invention in an advantageous manner. For this purpose, on the one hand, the following explanation of preferred embodiment examples of the invention is made in reference to the drawings. In connection with the explanation of the preferred embodiment examples of the invention in reference to the drawing, generally preferred embodiments and developments of the teaching are explained.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 10 shows three diagrams of an embodiment example of 6 fans which are connected together in parallel in a fan grid, of which, however, in each case a different number of fans is actively switched on.

The drawings are provided herewith for purely illustrative purposes and are not intended to limit the scope of the present invention. In the figures, identical reference numerals refer to identical structural and/or functional features.

DETAILED DESCRIPTION

The following description is merely exemplary in nature and is in no way intended to limit the present disclosure or its application or uses. It should be understood that throughout the description, corresponding reference numerals indicate like or corresponding parts and features.

Figure 1:
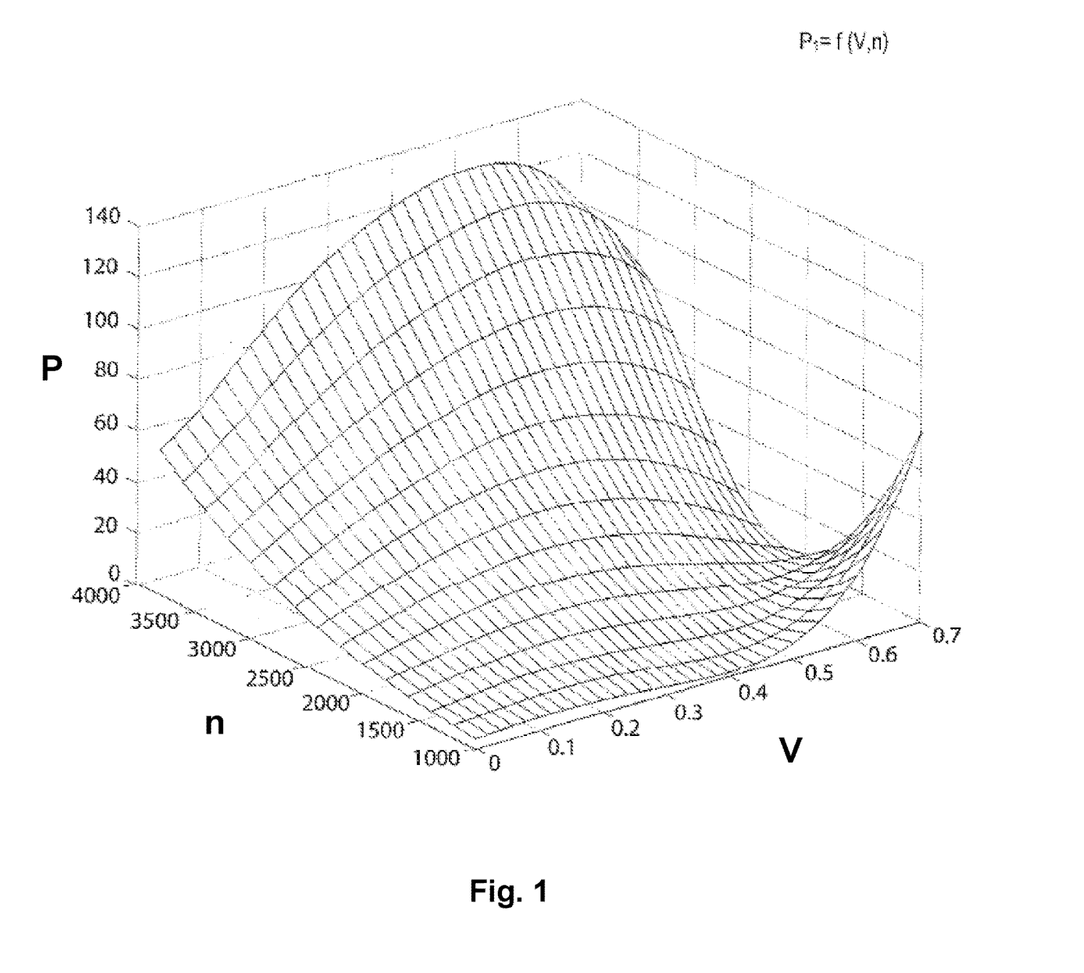
FIG. 1 shows a diagram which shows the correlation of the power consumption P with the volume flow V and the rotation speed n of an exemplary fan.
Figure 2:
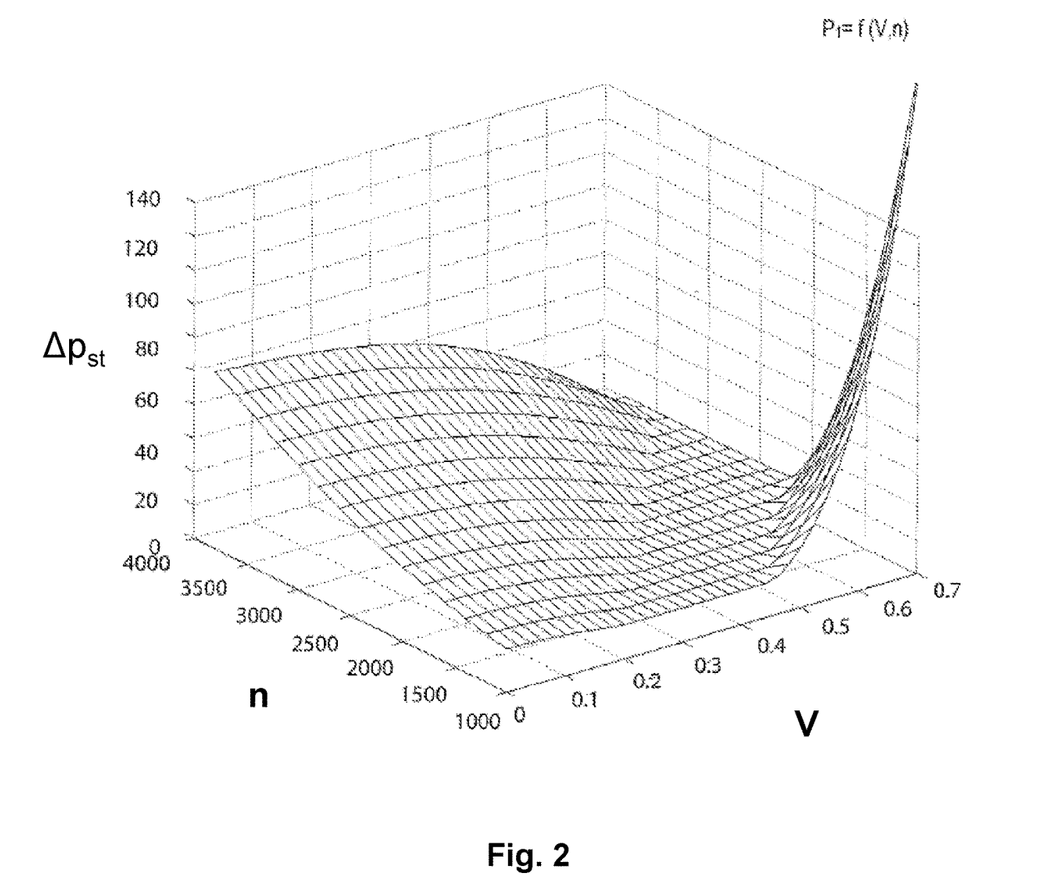
FIG. 2 shows a diagram which shows the correlation of the pressure increase $\Delta p_{st}$ (static pressure) with the volume flow V and the rotation speed n of an exemplary fan.
Figure 3:
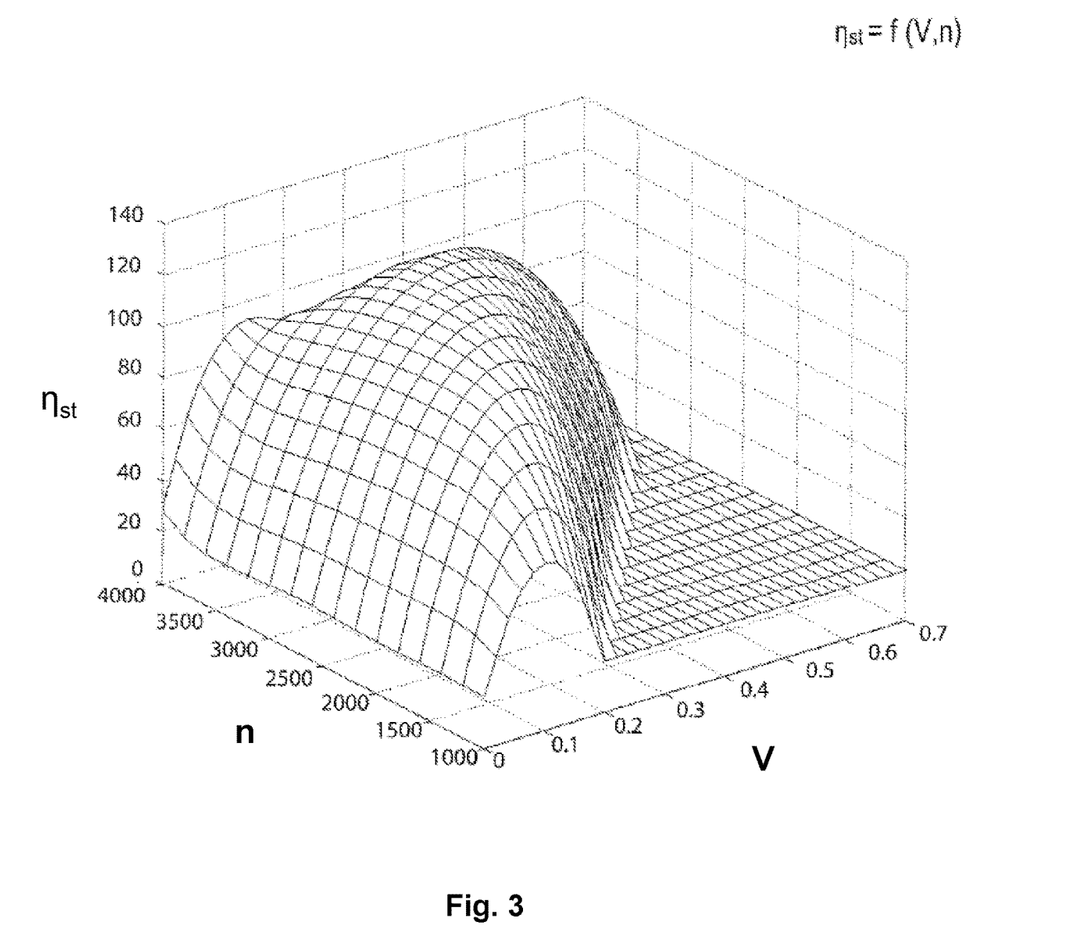
FIG. 3 shows a diagram which shows the correlation of the efficiency $\eta_{st}$ with the volume flow V and the rotation speed n of an exemplary fan.

According to an embodiment example of the method according to the invention, for the determining of the operating state, reference is made to FIGS. 1 to 3. For this purpose, in FIGS. 1 to 3, a diagram is shown which in each case shows the correlation between the power consumption P or the pressure increase Δpst (static pressure) and the efficiency ηst as well as the volume flow V and the rotation speed n of an exemplary fan from the group of the fans. These variables n, V, P, Δpst and ηst represent acquired operating states or values correlated therewith, which are used in the control method.

Figure 4:
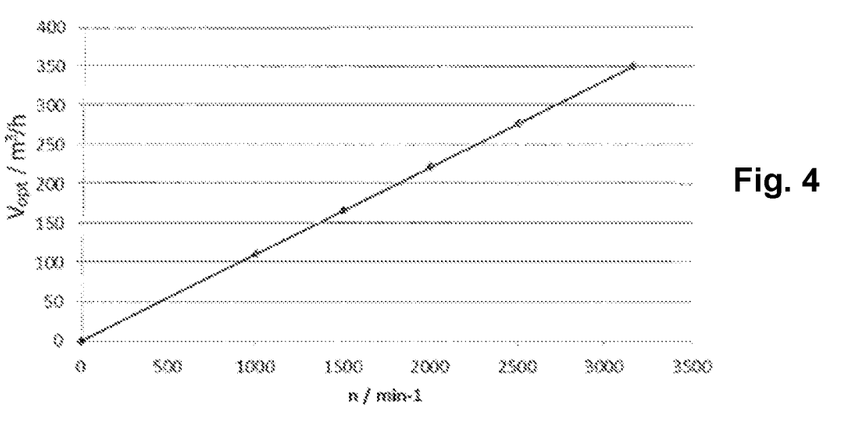
FIG. 4 shows a diagram which represents the course of the optimal volume flow as a function of the rotation speed of a fan.
Figure 5:
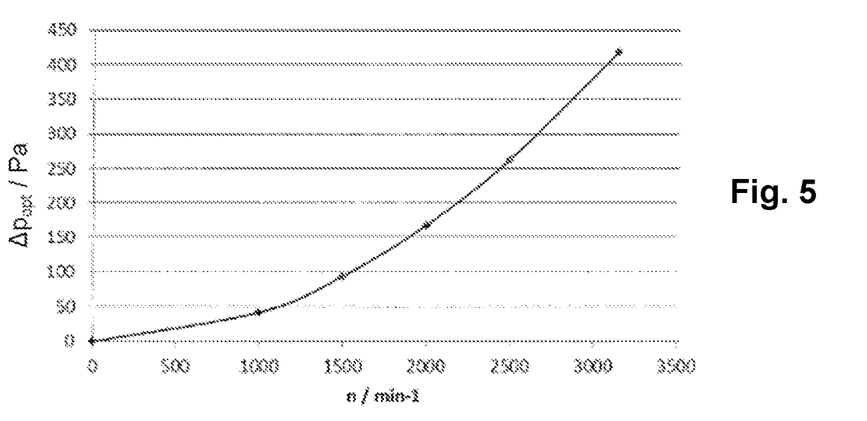
FIG. 5 shows a diagram which represents the course of the optimal static pressure $\Delta p_{opt}$ as a function of the rotation speed of a fan.
Figure 6:
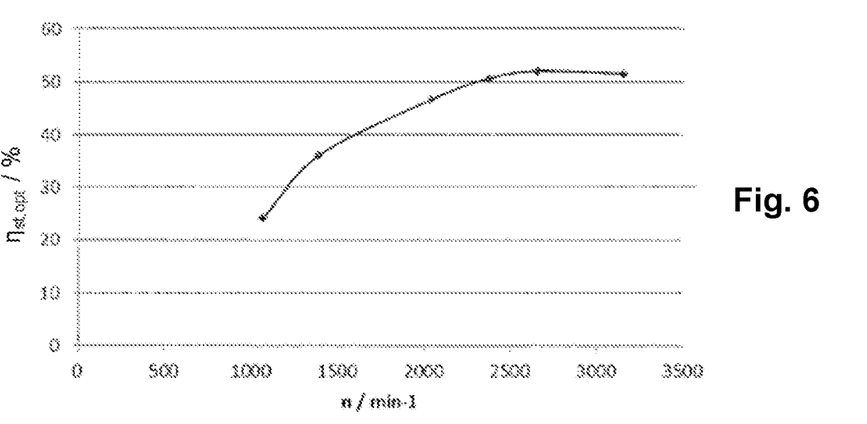
FIG. 6 shows a diagram which represents the course of the optimal efficiency $\eta_{opt}$ as a function of the rotation speed of a fan.

In FIGS. 4 to 6 shows the optimal points of the volume flow $V_{opt}$ and the pressure increase $\Delta p_{opt}$ and the correspondingly associated efficiency $\eta_{opt}$ and the pressure increase $\Delta p_{opt}$ which can be achieved at constant rotation speed with the measured rotation speed. For this purpose, FIG. 4 shows a diagram which shows the optimization potential of the volume flow $V_{opt}$ in m³/h as a function of the rotation speed n of a fan in a range from the rotation speed n=0 to approximately n=3200 rotations per minute.

FIG. 5 shows a diagram which represents the optimization potential of the static pressure $\Delta p_{opt}$ as a function of the rotation speed n of a fan, and FIG. 6 shows the optimization potential of the efficiency $\eta_{opt}$ in % as a function of the rotation speed n of a fan.

Figure 7:
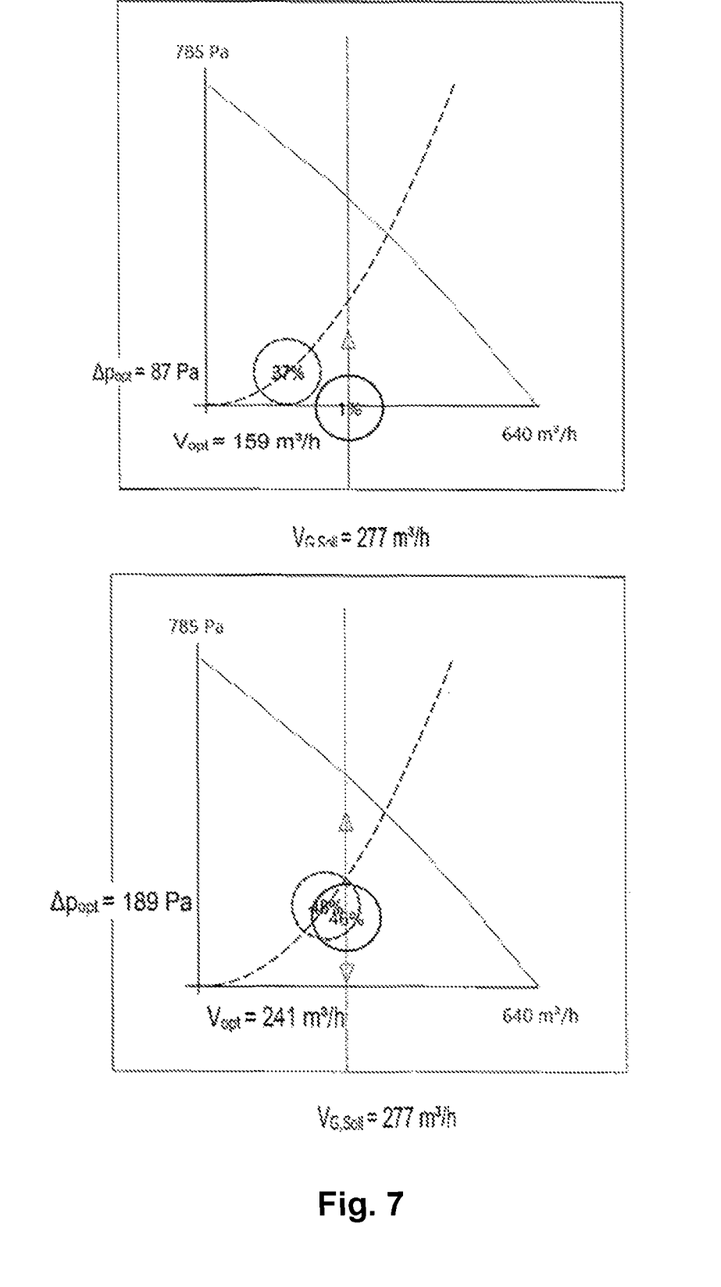
FIG. 7 shows a comparison of two states of a fan at a constant volume flow in the system, wherein the static pressure in the system was reduced in order to increase the pressure availability $\Delta p_{st}$ for the fan in order to thereby increase the efficiency.

FIG. 7 shows a comparison of two states of a fan at constant volume flow in the system, wherein the static pressure in the system was reduced in order to increase the pressure availability $\Delta p_{st}$ for the fan and thus increase the efficiency, as shown in the right figure.

Figure 8:
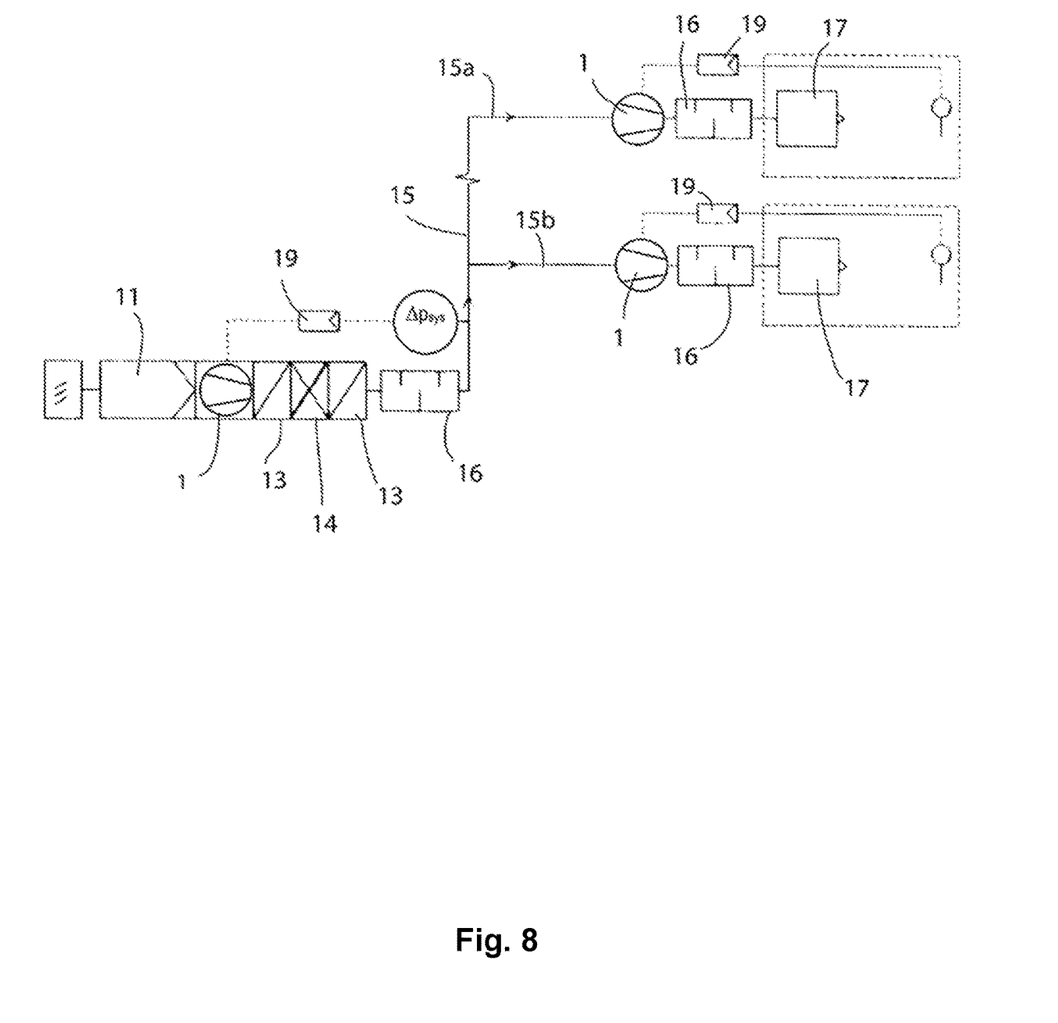
FIG. 8 shows a diagrammatic view of a decentralized fan system with fans as volume flow controller.

In FIG. 8, a diagrammatic view of a decentralized fan system with fans as volume current controller is shown. Shown is a ventilation system consisting of a central ventilation station 10 comprising an air filter 11, a fan 1, two heat registers 13 and a cold register 14 located in between, which are connected via a ventilation channel 15 to a damper 16. From the damper 16, the ventilation channel 15 leads to two ventilation stacks 15a, 15b in which a fan 1 with a damper 16 and an air passage 17 are provided in each case. Furthermore, a collector $\Delta p_{sys}$ is provided. The fans 1 are connected by control technology to acquisition means 19, wherein this system is formed, for example, as a volume flow control system, in which the volume flow is variably controlled via the decentralized fans 1 with the described method, in order to adjust the pressure in the system.

Via the central ventilation station 10, the system pressure for the decentralized fans 1 can be set according to an optimization recommendation. This means:

$\Delta p_{st} < \Delta p_{opt}$: The central ventilation station 10 should reduce the system pressure in the collector $\Delta p_{sys}$ so that the individual fans 1 have to overcome more pressure or $\Delta p_{st} > \Delta p_{opt}$: The central ventilation station 10 should increase the system pressure in the collector $\Delta p_{sys}$ so that the individual fans 1 are relieved and have to generate less pressure.

In another embodiment example, not represented in further detail, for example, 6 fans are connected in parallel operation to form a fan grid for volume flow-variable application.

If the volume flow V is to the left of the optimum, i.e., if the condition $V < V_{opt}$ is met, then an optimization can be achieved in that participating fans 1 are switched off. In FIG. 8, from top to bottom, the situations are represented in which first 6 fans 1 are working in the fan grid, and then only 5 fans 1, and below only 4 fans 1, wherein the other fans 1 have then been switched off.

In the sense of the optimization recommendation, the fans 1 remaining in the fan grid have to deliver in each case more volume at identical system pressure (in this example 500 Pa), but therefore they work optimally overall, so that a higher efficiency is reached in the system.

At the operating point with a volume flow V of 10,000 m³/h at 500 Pa, the individual fans work in each case optimally. An operating point with a volume flow V of 40,000 m³/h at 500 Pa can selectively be achieved with 6 or 5 or 4 fans in parallel operation. This results in the following data:

total efficiency with respect to the static pressure increase with 6 fans $\eta_{st}$=56%, power 100% (P=9846 W);

total efficiency with respect to the static pressure increase with 5 active fans $\eta_{st}$=59%, power reduction −5% (P=9374 W) and total efficiency with respect to the static pressure increase with 4 active fans $\eta_{st}$=62%, power reduction −10% (P=8988 W).

Figure 9:
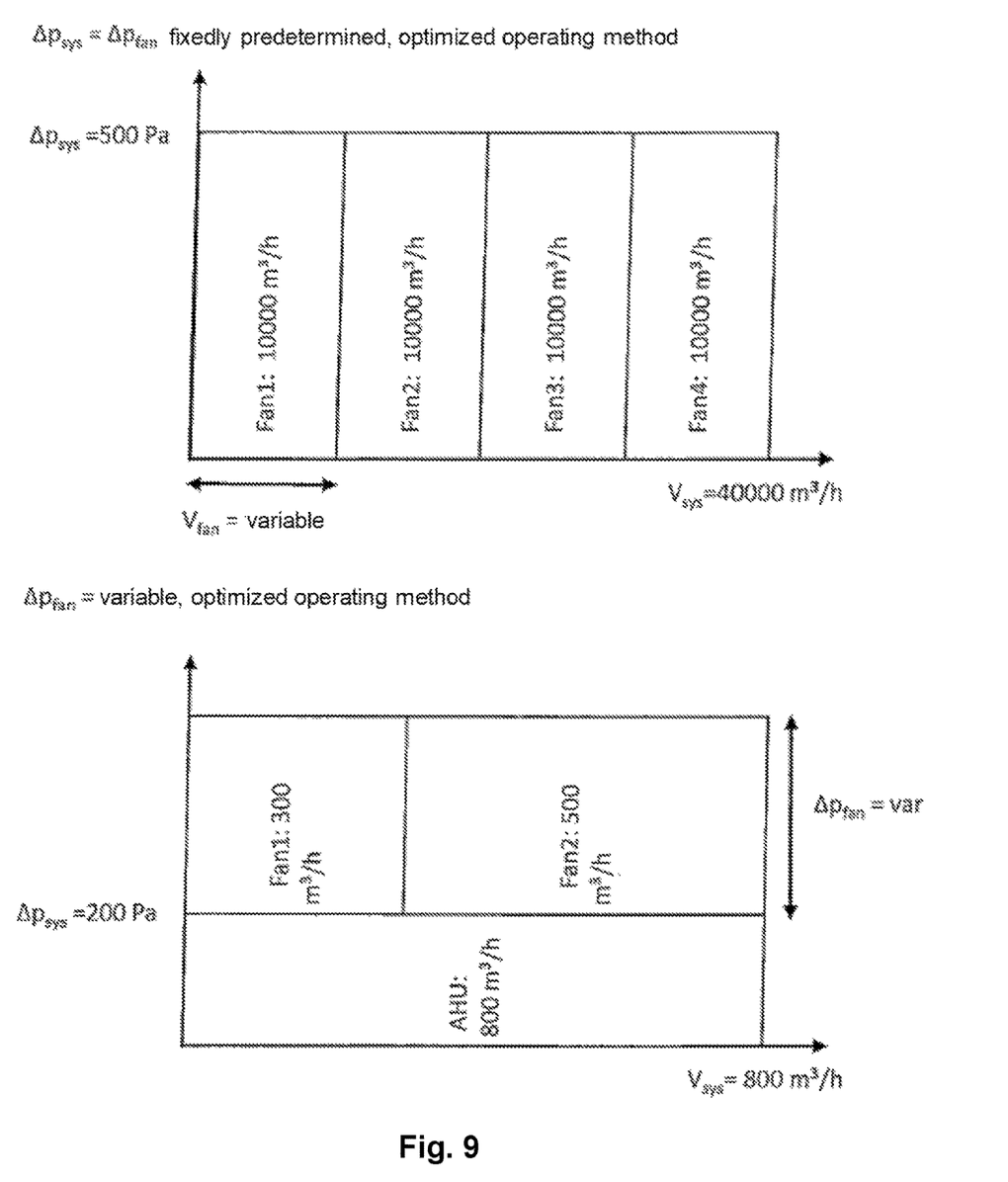
FIG. 9 shows an example of variable pressure.
Figure 10:
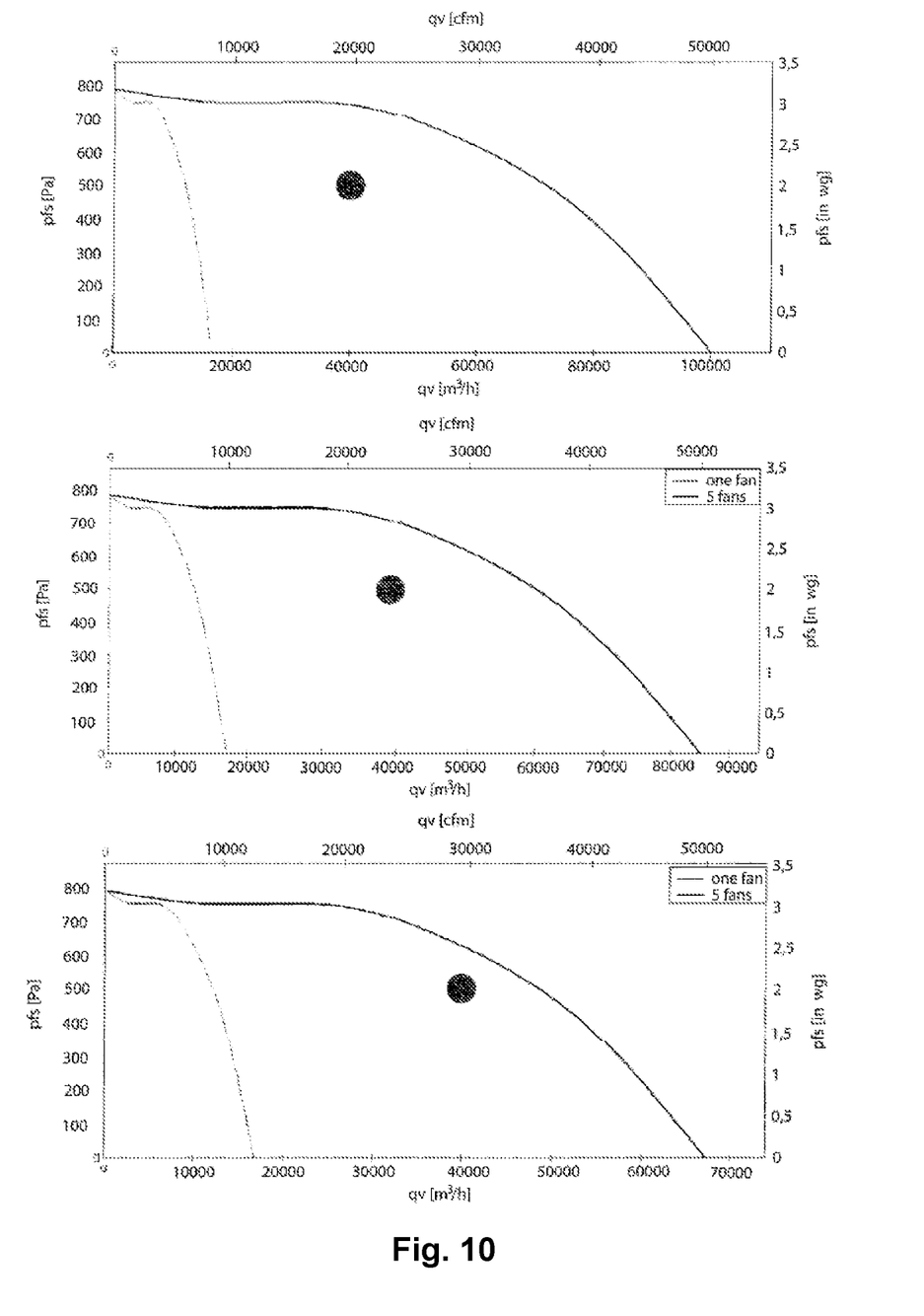
Figure 11:
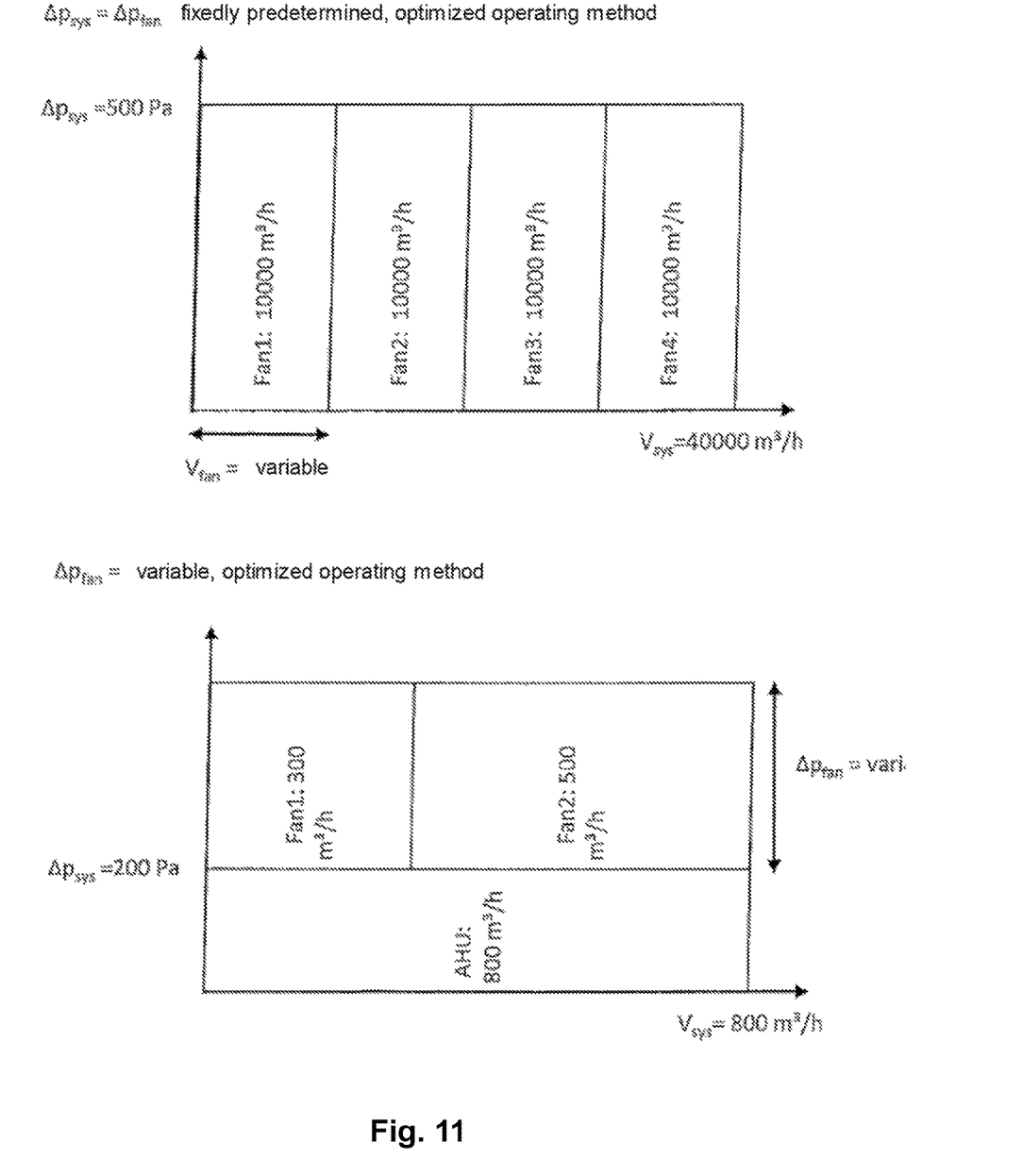
FIG. 11 shows an example of variable volume flow.

In FIGS. 9 and 11, the correlations between volume flow $V_{sys}$ and pressure $\Delta p_{sys}$ for the examples of variable pressure at constant volume flow or variable volume flow at constant pressure are represented for 6 or 4 fans in each case.

Such a solution represents an exemplary implementation of the invention, wherein the control method for the fans is based on the fact that multiple fans of the fan grid know their operating state as well as their respective power optimization potential. On this basis, the distribution of the air quantities to the individual fans at constant system pressure occurs so that an operation of only four fans leads to an optimized efficiency of $\eta_{st}$=62%.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

While the above description constitutes the preferred embodiments of the present invention, it will be appreciated that the invention is susceptible to modification, variation and change without departing from the proper scope and fair meaning of the accompanying claims.

The invention claimed is:

1. A method for controlling a system comprising a number n of at least two fans and/or fan groups for generating a setpoint value ($V_{G,setpoint}$, $\Delta p_{G,setpoint}$) of either a fixed volume flow $V_{G,setpoint}$ in the system with a variable pressure increase $\Delta p_{G,setpoint}$ or a fixed pressure increase $\Delta p_{G,setpoint}$ in the system with a variable volume flow $V_{G,setpoint}$, as defined by the following steps:
   a) determining the current operating state for each of the fans;
   b) determining the power optimization potential for each of the fans as defined according to concrete operating states for which each fan is brought to a power optimized state;
   c) comparing the current operating state determined in the aforementioned step a) with the power optimization potential of the fans from step b), to obtain an optimization recommendation with respect to at least one of the fans, and
   d) correction of the setpoint value ($V_{G,setpoint}$, $\Delta p_{G,setpoint}$) by changing the operating state of the at least one of the fans, depending on which setpoint value is fixedly predetermined, thereby, bringing the at least one of the fans to the power optimized state and thereby increasing an efficiency $\eta G$ of the system,
   wherein in step a), the determination of the current operating state of each of the fans occurs in that at least the volume flow V and the rotation speed n of each fan is determined, and the pressure increase $\Delta pst$, the power consumption P and the efficiency $\eta G$ are determined as a function of the volume flow and of the rotation speed, which are stored in motor electronics associated with the plurality of fans, and wherein, in the determination of the optimization recommendation for the adjustment of the operating state for the at least one of the fans in step c), includes the fan that makes highest power contribution to air conveyance in the system.

2. The method according to claim 1, characterized in that step d) occurs in such a manner that a plurality of the fans are brought to the power optimized state.

3. The method according to claim 2, characterized in that, the efficiency $\eta G$ of the system is increased when one or more of the fans are switched off.

4. The method according to claim 1, characterized in that the efficiency $\eta G$ of the system is increased when one or more of the fans are switched off.

5. The method according to claim 1, wherein, determining the optimization potential in step b) includes identification of an optimized volume flow $V_{opt}$ and an optimized pressure increase $\Delta p_{opt}$ for each of the fans.

6. The method according claim 5, wherein, in step c) one of the following occurs:
   a. the optimization recommendation in the case of a defined volume flow $V_{G,setpoint}$ to be kept constant consists in carrying out a pressure increase or decrease, depending on whether the optimized pressure increase $\Delta p_{opt}$ is greater than or smaller than the determined pressure increase $\Delta pst$ or
   b. the optimization recommendation in the case of a defined pressure $P_{G,setpoint}$ to be kept constant consists in increasing or lowering the volume flow, depending on whether the optimized volume flow $V_{opt}$ is greater than or smaller than the determined volume flow V.

7. The method according to claim 6, wherein steps a) through d) are cyclically repeated until the correction in step d) results in either a targeted total efficiency, a total efficiency optimized with respect to the previous cycle, or a targeted total efficiency that is asymptomatically approached, wherein the cyclic repetition of steps a) through d) are halted at the latest after a predefined number of cycles.

8. The method according to claim 1, wherein a measurement of power consumption P of each fan occurs before and after the correction in step d), and it is determined whether a total sum of all the power consumptions P of the fans, measured after the correction in step d), was reduced in comparison to the total sum of all the power consumptions P measured before the correction in step d).

9. The method according to claim 8, wherein if the total sum of all the power consumptions P after the correction in step d) was not reduced, the change in the operating state of the at least one fan that was made in the previously performed optimization step d) is reversed.

10. The method according to claim 9, wherein steps a) through d) are cyclically repeated until the correction in step d) results in either a targeted total efficiency, a total efficiency optimized with respect to the previous cycle, or a targeted total efficiency that is asymptomatically approached, wherein the cyclic repetition of steps a) through d) are halted at the latest after a predefined number of cycles.

11. The method according to claim 8, wherein steps a) through d) are cyclically repeated until the correction in step d) results in either a targeted total efficiency, a total efficiency optimized with respect to the previous cycle, or a targeted total efficiency that is asymptomatically approached, wherein the cyclic repetition of steps a) through d) are halted at the latest after a predefined number of cycles.

12. A control device for carrying out a method of controlling a ventilation system comprising a number n of at least two fans and/or fan groups according to claim 1, wherein the control device comprises the following:
   a. an acquisition system configured to determine the volume flow of individual fans and all the fans;
   b. a collector for determining of a power optimization potential $V_{opt}$ or $\Delta p_{st,opt}$ for the respective fans, which can be achieved with constant rotation speed with the rotation speed n;
   c. a comparator for comparing the determined operating states with the power optimization potential states determined by the collector in order to obtain a specific optimization recommendation therefrom; and
   d. a central ventilation station configured to adjust a respective variable setpoint value by changing the operating state of at least one fan depending on which setpoint value in the system is fixedly predetermined, in order to bring at least one of the fans to a power optimized or optimal operating point and thereby increase the efficiency $\eta G$ of the ventilation system.

13. The control device according to claim 12, characterized in that step d) occurs in such a manner that a plurality of the fans are brought to a power optimized state.

14. The control device according to claim 12, characterized in that the efficiency ηG of the ventilation system is increased when one or more of the fans are switched off.

15. The control device according to claim 12, wherein, in step c) one of the following occurs:
   a. the optimization recommendation in the case of a defined volume flow $V_{G,setpoint}$ to be kept constant consists in carrying out a pressure increase or decrease, depending on whether the optimized pressure increase $\Delta p_{opt}$ is greater than or smaller than the determined pressure increase Δpst or
   b. the optimization recommendation in the case of a defined pressure $P_{G,setpoint}$ to be kept constant consists in increasing or lowering the volume flow, depending on whether the optimized volume flow $V_{opt}$ is greater than or smaller than the determined volume flow V.

16. The control device according to claim 12, wherein a measurement of power consumption P of each fan occurs before and after the correction in step d), and it is determined whether a total sum of all the power consumptions P of the fans, measured after the correction in step d), was reduced in comparison to the total sum of all the power consumptions P measured before the correction in step d);
   wherein if the total sum of all the power consumptions P after the correction in step d) was not reduced, the change in the operating state of the at least one fan that was made in the previously performed optimization step d) is reversed.

17. The control device according to claim 12, wherein steps a) through d) are cyclically repeated until the correction in step d) results in either a targeted total efficiency, a total efficiency optimized with respect to the previous cycle, or a targeted total efficiency that is asymptomatically approached, wherein the cyclic repetition of steps a) through d) are halted at the latest after a predefined number of cycles.

* * * * *